United States Patent [19]

Tompkins

[11] 4,317,137
[45] Feb. 23, 1982

[54] OPTICAL SCAN HEAD AND PRINTER

[75] Inventor: Elliot N. Tompkins, Melbourne Beach, Fla.

[73] Assignee: Harris Corporation, Cleveland, Ohio

[21] Appl. No.: 906,773

[22] Filed: May 17, 1978

[51] Int. Cl.$^3$ .................... H04N 1/028; H04N 1/036
[52] U.S. Cl. .................................. 358/286; 358/285; 358/293
[58] Field of Search ............... 358/200, 285, 286, 293, 358/294, 296, 302, 300, 256; 354/5, 6, 18

[56] References Cited

U.S. PATENT DOCUMENTS

| | | | |
|---|---|---|---|
| 3,071,646 | 1/1963 | Dew | 358/300 |
| 3,229,033 | 1/1966 | Artzt | 358/281 |
| 3,546,707 | 12/1970 | Dixon et al. | 358/300 |
| 3,609,233 | 9/1971 | Nagao | 358/294 |
| 3,610,824 | 10/1971 | Hansen et al. | 358/300 |
| 3,845,239 | 10/1974 | Granzow et al. | 358/300 |
| 3,872,248 | 3/1975 | Winters | 358/294 |
| 3,899,035 | 8/1975 | Rothgorot | 358/286 |
| 3,988,742 | 10/1976 | Meier et al. | 358/302 |
| 3,997,722 | 12/1976 | Bardos | 358/302 |

FOREIGN PATENT DOCUMENTS 1394572  5/1975  United Kingdom ............... 358/285

OTHER PUBLICATIONS

Baxter, Scanner Using Linear Array of Light Emitting Diodes, vol. 15, #1, Jun. 1972, IBM Tech. Discl. Bull, p. 4.
Bachtold et al., Facsimile Equipment and Document I/O Device, vol. 15, #5, Oct. 1972, IBM Tech. Disc. Bull., pp. 1558, 1559.
Mason, -Multifunction Optical Head, vol. 20, #3, Aug. 1977, pp. 1060, 1061.
Hoo, Coordinate Locator, IBM Tech. Discl. Bull., vol. 18, #5, Oct. 1975, pp. 1498-1499.
Anderson, Reflective Mark/Document Sensor, vol. 14, #6, Nov. 1971, IBM Tech. Discl. Bull., p. 1928.

*Primary Examiner*—Joseph A. Orsino, Jr.
*Attorney, Agent, or Firm*—Craig and Antonelli

[57] ABSTRACT

An optical scan head for reading and recording on a surface provides a plurality of light emitting diodes positioned in the form of a linear array for operating on an area of the surface of a document or photosensitive material. An electronic circuit is connected to the array for sequentially energizing each of the light emitting diodes in turn at a high rate to emit light and a fiber optic faceplate is disposed between the array and the surface to be illuminated for conducting the emitted light from each of the sequentially energized light emitting diodes to successive adjacent sections in the area of the surface being operated on. A photodetector is disposed to detect light reflected from the surface and provide a signal indicative of the data being read or printed. A scan head with the above-noted structure may be packaged very compactly, has low power consumption, and does not require precise spot alignment to a particular photodetector. A printer including such a scan head may have a sufficiently small size to be easily portable, producing a simple, high-speed apparatus of low cost.

32 Claims, 6 Drawing Figures

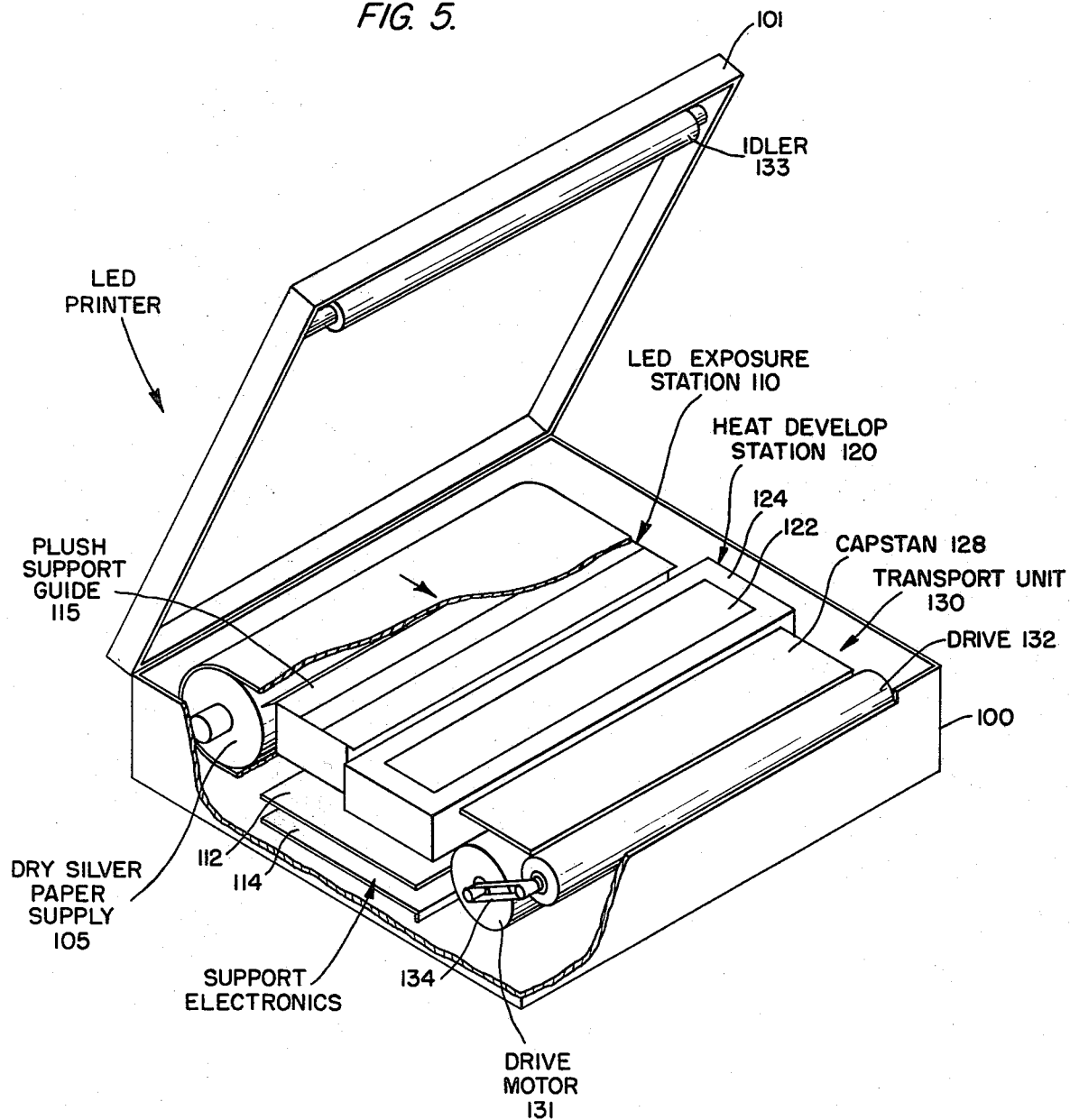

OPTICAL SCAN HEAD AND PRINTER

BACKGROUND OF THE INVENTION

1. Field of the Invention

The present invention relates in general to document reading and printing using optical solid-state scanners, and more particularly, to a small optical scan head for use in a document reading and recording apparatus.

2. Description of the Prior Art

Typical prior art optical scan heads comprise a housing with discrete simultaneously energized light emitting diode (LED) set therein, and further include a complicated fiber bundle light transmission channel for spreading out the light emitted from these LEDs and applying the light to a surface such as, for example, a document face. A plurality of photodetectors is also set in the housing for detecting light reflected from a prescribed area of the document face.

Discrete fiber optic bundles are generally utilized in the prior art to transmit reflected light from a designated section of the document area to a photodetector allotted for that designated section. Since each section in the area being scanned by the scan head has a corresponding photodetector, there must be a one-to-one correspondence between that particular section, its discrete fiber optic bundle, and the respective photodetector for that particular section. Because these light emitting diodes are energized simultaneously and the light emitted therefrom is spread out over the area being scanned, it is critical to maintain the precise alignment of each photodetector with its attendant fiber optic bundle. Otherwise, light from one section of the area being scanned might be detected both by the respective photodetector for that particular section and by an adjacent photodetector. Such detection by an adjacent photodetector would clearly cause an erroneous reading from the document face.

The above-described scan assembly system may be characterized as a spatially-dependent system. In other words, each particular segment of an area is blocked off and a particular photodetector is designated therefor. This type of prior art scan assembly system is particularly ill-suited for applications with small volume or packaging constraint. This is so because of the criticality of the fiber optic bundle photodetector alignment noted above. Additionally, this type of system has a relatively high power consumption.

OBJECTS OF THE INVENTION

An object of the present invention is to build a low-cost optical scanner capable of extremely small packaging.

A further object of the present invention is to eliminate the alignment criticality required for the individual photodetectors in prior art scan systems and their respective fiber optic transmission channels.

A still further object of the present invention is to build a small optical scan head having a very low power consumption.

Another object of this invention is to provide a very simple, small printer capable of high rates of operation which can be built using LED scanner technology such as provided by the optical scanner of the type described.

These and further objects, features and advantages of the present invention will become more obvious from the following description when taken in connection with the accompanying drawings which show, for purposes of illustration only, several embodiments in accordance with the present invention.

SUMMARY OF THE INVENTION

In order to achieve the foregoing objects, the present invention utilizes a temporal-type scanning to delineate the different sections of an area being scanned, in contrast to the spatial delineation used in the prior art. Moreover, a fiber optic faceplate has been substituted for the discrete fiber optic bundles used in the prior art to transmit light from the light-emitting elements to the surface being operated on.

The scan head of the present invention utilizing this temporal type delineation of area sections comprises a housing, a plurality of light-emitting elements in the form of a LED array positioned in said housing for operating on an area of a document surface, a circuit for sequentially energizing each of the light emitting elements to emit light, and a fiber optic faceplate for conducting the emitted light from each of the sequentially energized light emitting elements to different sections in the area of the document surface being operated on.

A scan head constructed in this manner has a low power consumption and is especially suitable for application with packaging constraints. Additionally, this scan head design obviates alignment criticality between any photodetectors used in the system and the transmission medium therefor.

The sequentially-addressed linear diode array can also be used to expose photosensitive materials, as well as scan existing documents. This feature can be used to create a compact, rugged and reliable printer based on the LED array technology.

In the scanner a planar, linear LED array is imaged onto a document with a fiber optic faceplate. The diode array is sequentially addressed to generate the scanning action, and the light reflected by the document is collected by a photodetector; thus, the detector signal is proportional to the document reflectivity at a given diode location.

In the printer the same LED scan principle is used so that the fiber optic faceplate forms well-resolved images of the light-emitting elements at the surface of a photosensitive material. By modulating the LED elements with an appropriate data stream and moving the photosensitive material orthogonal to the array, it is possible to generate an image of the document. Since the LED elements have light outputs proportional to their drive currents, gray levels, as well as bi-level data can be recorded. The photodetector and associated electronics are not required for the printer as they are for the scanner; however, if these features are included, the resultant device becomes a transceiver capable of data transmission (scanning) or data reception (printing). Furthermore, the detection circuitry could be used for feedback during the printing operation, which may be of benefit in certain applications.

BRIEF DESCRIPTION OF THE DRAWINGS

FIG. 5 is a perspective view partly in section of a novel printer using the optical scan head of the present invention.

DETAILED DESCRIPTION OF THE PREFERRED EMBODIMENT

Figure 1:
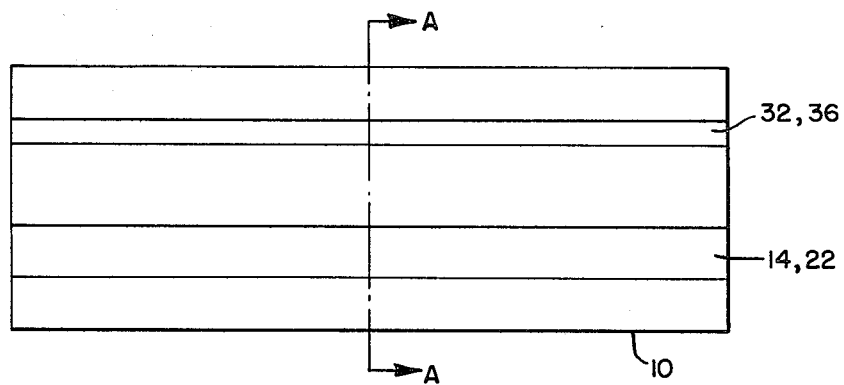
FIG. 1 is a plan view of the operational surface of a scan head constructed in accordance with the teachings of the present invention.
Figure 2:
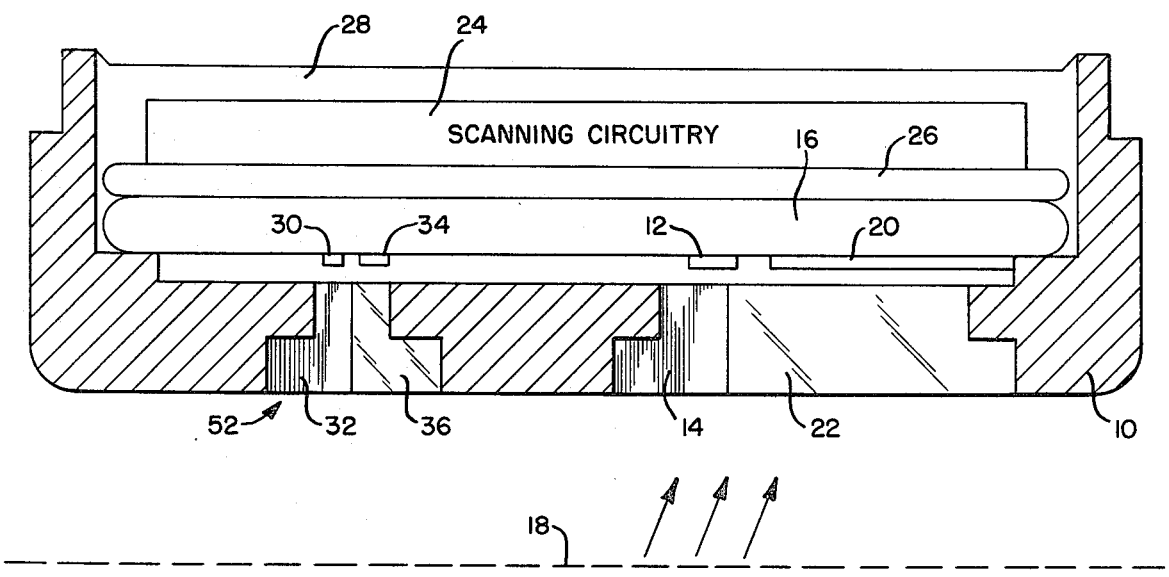
FIG. 2 is a sectional view along the section line A—A of the scan head shown in FIG. 1.

Referring to FIG. 1 of the drawings, there is shown a plan view of the optical scanner of the present invention, and FIG. 2 shows a cross section of this optical scanner, which may comprise a plurality of light-emitting elements 12 fabricated in solid-state form and arranged in a linear array. These light-emitting elements 12 are set in a substrate base 16 which, in turn, is set in a housing 10. It can be seen from a review of FIGS. 1 and 2 that this housing for the optical scanner can be made quite small. More specifically, an embodiment of the invention has been fabricated wherein the housing shown in the figures is 0.875 inches in width with a height of only 0.255 inches. The light emitted from these light-emitting elements 12 is imaged onto a surface 18, such as a document surface or a photosensitive surface, to be scanned by way of a fiber optic faceplate 14.

Generally, the light-emitting elements 12 are arranged in an array to cover a particular area of the surface 18, with the light emitted from each individual light-emitting element 12 being applied to a successively adjacent section in that area so that the entire area is covered by the array. The light-emitting elements 12 forming this array are sequentially addressed or energized by scanning circuitry 24 such that the light emitted from each individual light-emitting element 12 in the array is applied to its assigned section of the scanned area at a time different from all of the other light-emitting elements. The light applied to the area surface by way of the fiber optic faceplate 14 may be utilized to either read a pattern in this area or to record a pattern onto this area. A photodetector 20 may be set in the scan head for detecting the light scattered by the surface being scanned and for utilizing this detected light to either read the symbols in the particular area (reading function) or to control the modulation of the light being applied to the particular area (writing or recording function).

The above-described scan head may be implemented as seen in FIG. 2 by using light-emitting diodes (LED) as the light-emitting elements 12. These light-emitting diodes 12 are mounted in a ceramic substrate assembly 16. This substrate mounting may be accomplished, by way of example, by conventional epoxy bonding wherein the substrate 16 is metallized, and the electronic chips comprising the light-emitting diodes are bonded thereto with epoxy. This substrate assembly 16 is then positioned in the housing 10, which may be made, for example, of high-nickel steel, and which has a cut-out portion in which there is provided a window 22 disposed opposite the diode array. Preferably, the material of this housing should be thermally compatible with the material utilized for the window 22.

In a preferred embodiment, the scanning circuitry 24 for sequentially energizing the light-emitting diodes 12 may be located in the scanning head itself. This scanning circuitry 24 may be positioned in the volume or space above the substrate 16 which is dedicated to the scanning or driver electronics. The electronic chips utilized for this scanning circuitry 24 may be mounted on a substrate assembly 26 composed of ceramic, by way of example, with conventional epoxy bonding by metallizing the ceramic substrate 26 and then bonding the electronic chips thereto with epoxy. A header or top cover 28 may then be positioned over the scanning circuitry 24 to provide an interface for connections thereto. This header may be formed from either metal or ceramic, as desired.

Figure 3:
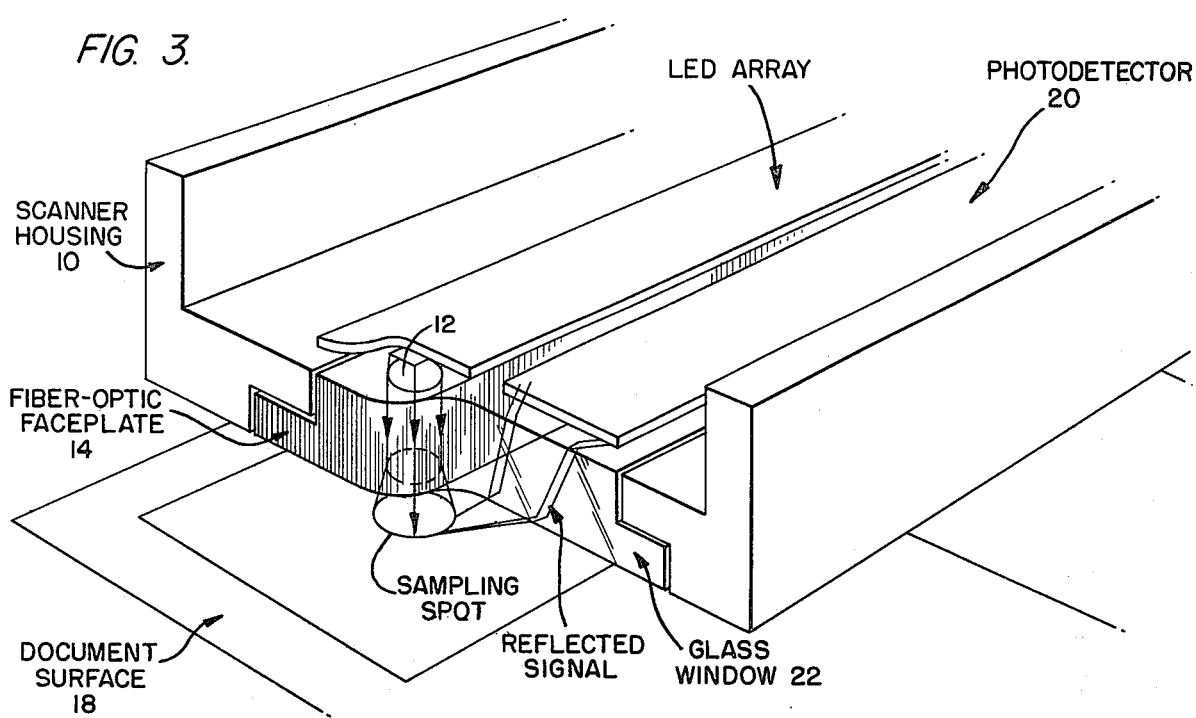
FIG. 3 is a diagrammatic view in perspective illustrating the operation of the scan head of the present invention.

The light-emitting elements 12, as shown in FIG. 3, define a linear array extending the length of the scan head and may comprise 450 elements which are sequentially addressed. Thus, this array covers an oblong area extending the length of the array above the surface 18 which is to be optically scanned. It should be emphasized at this point that although the array shown in FIG. 3 has a linear configuration, the present invention is in no way confined to such a configuration.

The faceplate 14 is comprised of a dense array of fibers, each fiber being on the order of 8 microns in diameter. With such a construction, as many as 100 individual fiber optic elements will transmit light from each light-emitting element 12. This provides a high redundancy factor for the system and eases the alignment requirements between the light emitting element array and the faceplate. By way of example, a fiber optic faceplate of this type can be obtained from the American Optical Corporation under their designation A-70. This faceplate 14 may be bonded to the housing 10 using a standard glass-metal bonding technique such that there is an air gap between the light-emitting element 12 and the top edge of the faceplate 14. The use of such an air gap is advantageous in that damage to the light-emitting element 12 from vibrations in the fiber optic faceplate 14 or due to flexure of the substrate 16 is prevented. This air gap may be on the order of 2-4 mils in order to prevent significant light diffusion between the light-emitting element 12 and the faceplate 14.

The photodetector 20 is positioned in the housing 10 to collect and detect the light reflected or scattered from the area of the surface being operated on. A variety of detector configurations can be utilized to perform this function. For example, either one long narrow detector, as shown in FIG. 3, or a plurality of detectors may be positioned to run parallel to the linear array of light-emitting elements to detect the light emitted therefrom. If added light gathering efficiency is required, two rows of photodetector plates 20 could be set on opposite sides of the linear light-emitting element array. This geometry of parallel rows of photodetector plates has the advantage of eliminating specular reflections from the area being operated on to the photodetectors. These detectors may be implemented, by way of example, by Schottky barrier PIN photodiodes, which may be bonded to the substrate 16 by means of conventional epoxy bonding.

The spacing shown in FIG. 2 between the photodetectors 20 and the bottom surface of the housing may be filled with an optical window 22 for conducting the light reflected from the area being operated onto the photodetector 20. This window may be composed, by way of example, of glass of the type manufactured by the Schott Corporation under their designation GW 12, and may be bonded to the fiber optic faceplate by soldering. Both this window 22 and the fiber optic faceplate 14 may be hermetically sealed against the metal housing 10.

In order to protect the photodetectors 20 from exposure to stray light, the window 22 can be coated with a narrow bandpass optical coating which will transmit or pass only one wavelength and will absorb all other spectral components. Such interference filter coatings generally are formed from dielectric materials. Additionally, in order to protect the exposed surface of the window 22, this surface may be metallized over its entire area except for a narrow slit of approximately 0.008 inches in width to allow light reflected from the surface to be applied to the photodetector. Such a metallization procedure is generally accomplished by means of a vapor deposition of either aluminum, chrome, or gold. The choice of a metal for deposition will depend on the adhesion properties required in the particular application. This metallizing procedure, in addition to protecting the scan surface of the window 22, also acts as a light baffle to protect the photodetectors from exposure to stray light and forms an efficient light correction cavity between the photodetector and the metallized surface.

The operation of this scan head will be discussed in the context of the reading of symbols on a document surface in conjunction with FIG. 3. Each of the light-emitting elements 12 of the array are sequentially energized by the scanning circuitry 24. The light emitted from each light-emitting element 12 is applied in sequence through the fiber optic faceplate 14 to the sampling spot on the face of a document 18. If the light-emitting element emission area is smaller than the center-to-center spacing of the light-emitting elements in the array, then it is generally helpful to permit the light emission from each array element to expand to the diameter dictated by the center-to-center element spacing. The small distance required to permit this light illumination expansion may be obtained by either holding the scan head a small distance above the document being scanned, or by providing a thin glass window between the fiber optic faceplate 14 and the document surface, the thickness of which provides the proper spacing of the light array from the document to produce proper light spot expansion. This spacing will ensure proper spot growth such that the desired area of the document is completely covered by the array of light-emitting elements 12.

As noted above, the light emitted from the light emitting-element 12 is applied through the fiber optic faceplate 14 such that it covers a predetermined section of the area of the document being scanned. This light is then scattered by the document 18 and a certain portion of it is collected by the photodetector 20 after passing through the glass window 22. The amount or intensity of the light detected by the photodetector corresponds to the reflectance of the document at the location illuminated by the light-emitting element. The photodetector 20 generates an electrical signal proportional to the amount of light detected and applies this signal to appropriate threshold circuitry. Generally, no additional demultiplexing or buffering is required. If two parallel rows of detectors are utilized, the outputs from these rows of detectors may be summed and applied to a single serial data port connected to a threshold circuit.

Each successive light-emitting element 12 is pulsed under the control of the scanning circuitry 24 until the entire array has been scanned. The signal detected from the photodetector 20 immediately after the pulsing of a particular light-emitting element 12 corresponds to the reflectance of that section of the document 18 to which the emitted light was applied. Thus, the light emitted from each particular section of the area of the document 18 being scanned is detected at a different time from the light reflected from all of the other sections of the area being scanned. Depending on the array configuration of the light-emitting elements 12, one or more lines may be scanned on a document by individually energizing each of the light-emitting elements 12 in rapid sequence over the entire length of the element array and by moving the scan head or the document in a direction transverse to the scanning direction of the array. The signal from the photodetector 20 represents a serial stream of data corresponding to the document reflectivity of the successive areas of the document illuminated by the array.

It should be noted that the above-recited optical scan head can be used in a variety of applications including manual scanning applications. Although the operation of the scan head was recited in the context of a document reading application, it should be emphasized that the scan head is clearly not limited to such applications. More specifically, the scan head can be used as a recorder or printer by scanning photosensitive material while modulating the light-emitting element array with the desired data, as will be described hereinafter in connection with FIG. 5. The photodetectors 20 can then be utilized as feedback sensors to obtain modulation control. It should be noted that it is possible to utilize the same light-emitting diodes for both reading and printing.

The scan head with the foregoing construction is especially suitable for applications in which there are tight volume constraints, such as portable equipment of small size. This scan head is simple in design, has a low power consumption, and can be easily hermetically sealed. Additionally, this scan head provides high resolution and does not require a precise alignment of the individual photodetectors to their transmission mediums. Moreover, there may be a misalignment by as much as 0.005 inch between the planes of the light-emitting diode and the fiber optic faceplate and still obtain acceptable resolution of the light detected from the document. Also, along this line, due to the optical qualities of the fiber optic faceplate, it is possible to have a misalignment from parallel by as much as 1/16 inch between the planes of the document surface and the fiber optic faceplate and still obtain acceptable resolution. However, to obtain optimum results in this regard, the fiber optic faceplate should be polished so that it is flat.

The basic temporal concept upon which the present invention is based provides many of the advantages set forth above. This concept is characterized in that a plurality of light-emitting elements are utilized, each light-emitting element having its light transmitted to a particular section of an area being operated on. By separating the energization of these light-emitting elements in time, it is possible to detect the reflectance for each individual section of the area by one photodetector or by a plurality of photodetectors summed at one input terminal. This temporal concept thus substantially eliminates the alignment problems caused when spatial type scan heads are utilized having an individual photodetector for each particular section of the area being operated on.

In some applications, it may be desirable to include an additional detector in the scan head for determining when the scan head is sufficiently close to the document to obtain proper scanning. Such a document detector 52 has been integrated into the scan head shown in FIG. 2, and includes a light-emitting element 30, such as a light-emitting diode, a fiber optic faceplate 32, a photodetector 34, and a window 36. When the scan head is being used, the light-emitting diode 30 is energized continuously and the light emitted therefrom is applied to the document surface through the fiber optic faceplate 32 in the same manner as the element 12 and the faceplate 14 on the other side of the scan head. If the document is sufficiently close to the scanning head to permit a proper scanning operation, then sufficient light will be reflected from the document surface and applied by means of the window 36 to the photodetector 34 to cause a signal to be generated by the photodetector 34 which will initiate the scanning operation. This initiation circuitry is generally comprised of a common thresholding circuit which will enable the scanning operation only when the output of the photodetector 34 reaches a minimum threshold level. Thus, this document detector is essentially a miniature duplicate, insofar as the basic structure thereof is concerned, of the adjacent scanning detector, but without the scanning operation.

Figure 4:
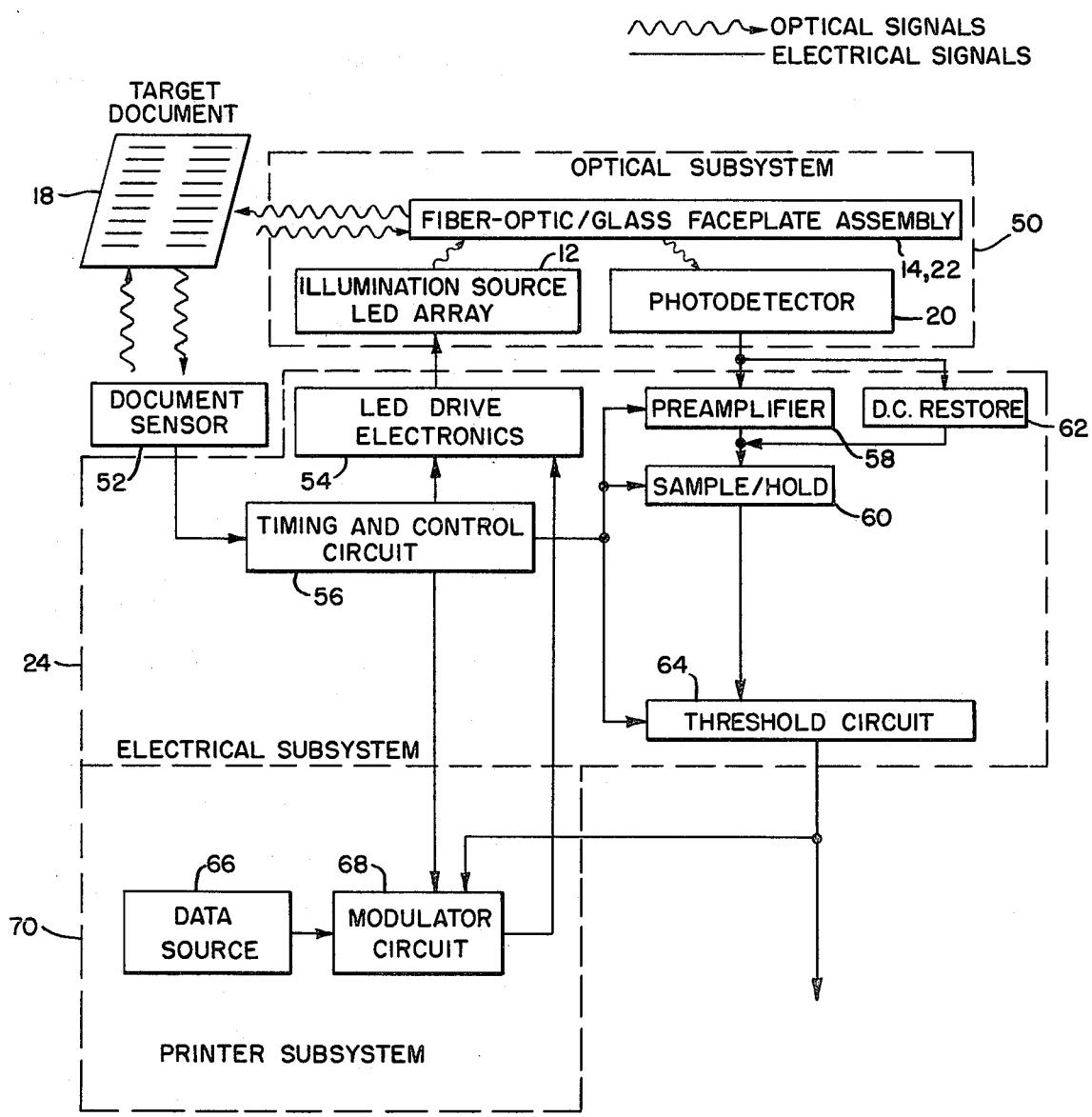
FIG. 4 is a schematic block diagram of an electronic scanning circuit which may be utilized in the scan head illustrated in FIGS. 1 and 2.

Referring now to FIG. 4, there is shown in functional block diagram form one embodiment of the present invention which may be utilized to implement the sequential scanning of the light emitting elements. The optical subsystem 50 of the scan head includes the fiber optic faceplate 14, the glass faceplate assembly 22, the LED array 12, and the photodetector 20, as seen in FIG. 2. The document sensor 52 on the other hand, which includes the elements 30, 32, 34 and 36 is shown separated from the scan head 50 for purposes of illustration. The third element of the scan head system is the electrical subsystem formed by the scanning circuitry 24.

The LED array 12 of the scan head is driven by means of driver electronics 54 which energizes each of the LEDs in the array sequentially in accordance with a timing signal generated by a timing and control electronics circuit 56. This timing and control electronics circuit 56 is composed of a clock generator and a plurality of counters connected in a manner well known in the art to obtain timing signals capable of sequentially scanning the plural diodes of the LED array 12. The timing and control circuit 56 is enabled by the document sensor 52 which senses the presence of a document close enough to the scan head to obtain proper light reflection therefrom. Thus, the scan head will operate to energize the LED array 12 only when the presence of a document is detected by document sensor 52.

The light reflected from the document face will be received via the glass faceplate 22 by the photodetector 20. The signal generated by the photodetector 20 is then synchronously detected by means of a sample and hold circuit 60 via a preamplifier 58, which are controlled by the timing and control circuit 56. The sample and hold circuit 60 receives the output of photodetector 20 via the preamplifier 58, both of which are energized in accordance with the timing signal obtained from the timing and control circuit 56 which controls the scanning of the LED array 12, such that the photodetector output is sampled only during the time when a LED is energized. A DC restorer circuit 62 is also connected to the output of the photodetector 20 and applies a signal to the input terminal of the sample and hold circuit 60 to compensate for drift in the output level of the photodetector and for various other offset voltages. The DC restorer operates to sample the output of the photodetector between scans in order to determine the detection signal level for a dark surface. This detected signal level is then subtracted from the following scan line by adding the output from the DC restorer 62 to the input of the sample and hold circuit 60. The output from the sample and hold circuit 60 is applied to a threshold circuit 64, which is also energized in accordance with the timing signal from the timing and control circuit 56. The threshold circuit 64 operates to convert the signal output into a binary signal which may be subsequently processed to determine the symbol or design on the document surface.

Where the scan head of the present invention is used in a document printer, a printer subsystem 70 may be associated with the scan head for purposes of controlling the LED array 12 to effect selective exposure of a photosensitive material to effect printing of data thereon. The printer subsystem 70 includes a modulator circuit 68 which is responsive to the timing and control circuit 56 in the electrical subsystem 24 for controlling the drive currents supplied to the LED elements in the array 12 on the basis of data received from a data source 66. The data source 66 could, for example, be a receiver capable of receiving and detecting a data communication from a remote location for printing, or it may comprise any other source of data or information which is desired to be printed. In such a printer arrangement, the synchronously-detected output of the photodetector 20 which is provided by the threshold circuit 64 may be applied to the modulator circuit 68 to aid in the synchronization and avoid errors in the printing operation.

One example of a very simple, small optical printer utilizing the optical scan head of the present invention is illustrated in FIG. 5. The printer is disposed within a housing 100 having a pivotable lid 101 and comprises four key functional parts: a source of photosensitive material 105, an exposure station 110, a processing subsystem 120, and a transport mechanism 130. The exposure station is formed by the optical scan head including the LED array 12, scanning subsystem 24 and modulator subsystem 70, as seen in FIG. 4. Printed circuit boards 112 and 114 are provided in the vicinity of the exposure station 110 and processing subsystem 120 to accommodate the necessary electrical circuitry associated with the functions performed by these devices. All of the elements of the printer are suitably supported within the housing 100 to provide a compact printing arrangement of relatively simple construction.

The transport unit 130 comprises a drive motor 131, a drive capstan 132, and an idler roller 133 mounted within the pivotable cover 101. Affectively, the capstan 132 is the only moving part in the transport unit 130, driven by the motor 131 via a cogged belt 134 or other suitable arrangement such as spur gears. Positioning the transport unit 130 as the last element in the system minimizes the probability of paper jams, thus ensuring high reliability in the operation of the printer. Friction-induced drag supplied by any suitable means at the supply reel of the source of photosensitive material 105 also serves to maintain proper paper tension, in the well known manner.

The source of photosensitive material 105 may be provided in the form of a roll of photosensitive paper or film or as a completely enclosed cassette if room light threading is desirable. Three types of recording material have sufficient photosensitivity in the red spectral region to be compatible with the LED array 12 in the scan head 110; for example, dry silver materials, electro-photographic materials or silver halide materials may be used. Conventional silver halide materials are clearly not desirable where the printer is to be portable, since these materials require wet processing. Electro-photographic materials such as zinc oxide and cadmium sulfide may be readily sensitized to the red spectral region, and the dry toners and well-designed toner applicators which are commonly available can reduce the inconvenience associated with the toning operation. In addition, such electro-photographic materials are not sensitized until charged and can be exposed to ambient light prior to charging, without effect. In addition, the shelf life and handling ease of the electro-photographic materials add to their appeal. However, dry silver recording materials provide several unique features which make them particularly desirable. With such materials, processing requires only heat and no consumables are required. In addition, the number of system parts needed to implement a dry silver printer are minimal, and additionally, very high quality imagery, including gray levels, can be reproduced for systems requiring these features. Dry silver recording materials are readily available and their characteristics are well known.

It has been found that a printer using an LED array and dry silver paper for recording can be constructed with surprising simplicity, having only a very few moving parts, with an extremely small space, permitting the printer to be easily portable and very simple to construct and operate.

The operation of the printer illustrated in FIG. 5 is quite simple. Loading and threading the paper is straight forward since no active elements are carried by the hinged cover 101 of the housing 100. To load the printer, the cover 101 is raised, the paper roll or cassette 105 is inserted into the housing 100, and the paper leader is brought across the exposure station 110, processing subsystem 120, and the drive capstan 132 of the transport unit 130. Threading is completed by simply shutting the cover 101, thereby capturing the paper between the idler 133 and the capstan 132. After these two simple operations are carried out, the printer is ready for recording. The paper, guided and held firmly against the various stations by plush or by polished metallic rub rails 115 of the type typically used in camera equipment, is positioned for recording.

A printer of the type illustrated in FIG. 5 may have a minimum size of $8'' \times 10'' \times 2.5''$ and produce a printing speed in excess of 2" per second and a resolution of 133 lines per inch. Such a printer may easily accommodate a paper storage capacity of 100 feet of 2.5 mil paper.

Dry silver paper is developed by the application of heat, and in this regard, the optimum processing temperature for 3M TYPE 7771 paper is 250° F. Reduced copy contrast and higher sensitivity can be achieved at higher development temperatures; however, it is imperative that for a small portable unit such as contemplated by the present invention, the heater design be very efficient, well insulated and have minimum thermal inertia (heat capacity). In this regard, the processing station 120 includes a heating unit 122 disposed within an insulating block 124.

The power required for the processing station 120 can be estimated by calculating the power needed to raise the paper to the desired temperature at the paper rates specified. This power is given by $$Q = G C_P \Delta T$$

where Q is the minimum heater power required, G is the mass flow rate of the paper, $C_P$ is the specific heat of the paper, and $\Delta T$ is the temperature change necessary for development. Assuming a $C_P$ of 35 BTU per pound per degree Fahrenheit, a G of 8.5 pounds per hour (based on 6 seconds per page) and a $\Delta T$ of 180° F., Q is 160 watts. Thermal foil heaters, which are widely used for such applications, are available with power densities of 50 watts per square inch and feature warm-up times under 10 seconds. These high power densities and fast warm-up times are well matched to the requirements of the present invention and afford minimum space and power consumption.

The fundamental mechanism determining system data rates and equivalent page rates is the combination of the spectral sensitivity of the dry silver paper and the associated light levels attainable with an LED array. In general, the average light power P required for exposure is given by $$P = SA/TD$$

where S is the spectral sensitivity of the recording medium, A is the area exposed in time T, and D is the scan duty cycle. The sensitivity of dry silver paper is a function of development temperature, illumination wavelength and exposure time. In addition, the sensitivity is related to the maximum density desired for the final copy. Assuming a development temperature of 250° F., maximum density of 1.0, a reciprocity failure factor of 3, and an exposing wavelength of 632.8 nm, the sensitivity S of 3M 7771 dry silver paper is approximately 100 ergs/cm². For a duty cycle of one, the average array power required at the paper to print an $8\frac{1}{2}'' \times 11''$ page in 6 seconds is approximately 800 μw.

It can be expected that the LED array 12 will operate safely at this duty cycle with a 500 μw output power. Assuming that 400 μw reaches the paper through the faceplate, exposure would result in a maximum density of about 0.6 instead of 1.0. An experiment to verify these values was conducted by scanning the developmental scanner over a piece of 3M Type 7773 Dry Silver Paper. The exposed film was subsequently processed in existing facsimile equipment. The average recorded density was approximately 0.5; the scan rate was 0.73 inches/second. For this test, the maximum exposing power at the paper was 60 μw with a duty cycle of 0.22 corresponding to a partially populated array with 100 elements. These parameters correspond to a sensitivity of 80 ergs/cm². From these tests and calculations, high performance of the system was seen, even at high data rates (200 kilopixels/sec) and page rates (6 seconds/page). However, an increase in recorded density may be necessary. A reduction in printing speeds or parallel addressing of the data can provide this increase. For example, a simple shift register data buffer could effectively double the exposure times, while still maintaining the original throughput rates.

Figure 6:
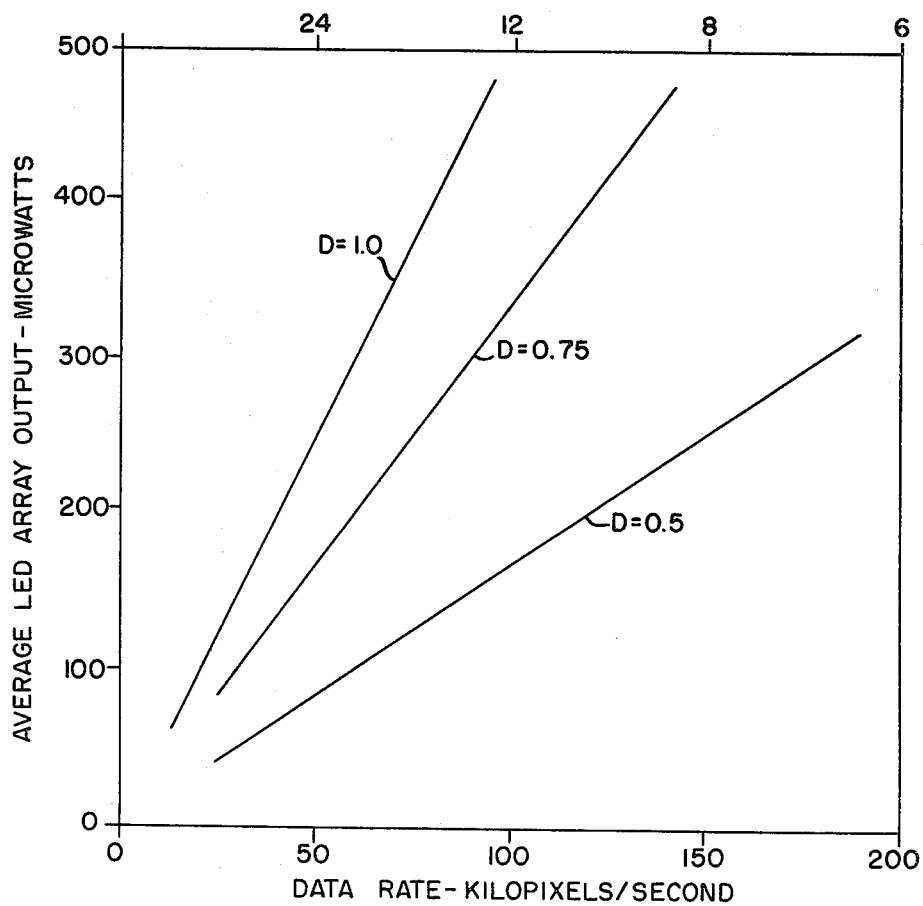
FIG. 6 is a diagram indicating LED power requirements versus data rate.

To assist in making tradeoffs in system rates, LED power output and maximum density of the final output copy, the interaction of these three parameters on system performance is shown in FIG. 6. The family of curves shown in the figure corresponds to various densities attained with given LED output power and data rates. The relationship between data rate and copy time is based on 133 pixel/inch sampling. There is significant latitude for effective system performance without changing data address formats or processing.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What is claimed is:

1. A scan head assembly for optically operating on a surface comprising:
   an array of light-emitting elements disposed to illuminate an area of said surface;
   means for sequentially energizing each of said light emitting elements to emit light and thereby illuminate successively adjacent regions of the area of said surface;
   fiber optic faceplate means for conducting the light emitted from said light emitting elements to the successively adjacent regions of said area of said surface; and
   a single photodetector means, disposed adjacent to said array of light-emitting elements, for detecting light that has been emitted by said light-emitting elements and reflected from said surface and for generating an electrical output signal representative of the amount of light reflected from the successively illuminated regions of the area of said surface.

2. A scan head assembly as defined in claim 1, further including means for synchronizing the operation of said photodetector means with said sequentially energizing means.

3. A scan head assembly as defined in claim 2, further including means, coupled to said photodetector means, for establishing a reference level between successive energizations of said light-emitting elements with respect to which the output signal of said photodetector means is defined.

4. A scan head assembly as defined in claim 1, wherein said sequential energizing means is responsive to the output signal of said photodetector means for controlling the energization of said light-emitting elements.

5. A scan head assembly as defined in claim 1, further including means for enabling said sequentially energizing means in response to a prescribed characteristic of said surface.

6. A scan head assembly according to claim 1, wherein said photodetector means is arranged to provide an electrical output signal representative of the light simultaneously received from each of said different regions of said area of said surface.

7. A scan head assembly as defined in claim 1, further including a non-fibrous window positioned between said surface and said photodetector for transmitting light reflected from said surface to said photodetector.

8. A scan head assembly as defined in claim 1, wherein said light-emitting elements comprise light-emitting diodes.

9. A scan head assembly as defined in claim 1, wherein said fiber optic faceplate means comprises a dense plate of parallel optical fibers with a large number of fibers communicating with each of said light-emitting elements.

10. A scan head assembly as defined in claim 1, further comprising means for detecting that said faceplate means is within a predetermined distance from said surface.

11. A scan head assembly as defined in claim 10, wherein said detecting means includes:
    a light-emitting element;
    fiber optic faceplate means for conducting light emitted from said light-emitting element to said surface; and
    a photodetector for detecting the intensity of the light reflected from said surface.

12. A scan head assembly as defined in claim 11, further including means, responsive to the output of said photodetector, for enabling the operation of said sequentially energizing means upon the output of said photodetector reaching a prescribed threshold level.

13. A scan head assembly as defined in claim 11, wherein said detecting means further includes means for energizing said light-emitting element independently of the successive energization of the light-emitting elements of said array.

14. A scan head assembly as defined in claim 1, wherein said array formed by said light-emitting elements is a linear array.

15. A scan head assembly as defined in claim 14, further including a plurality of photodetector sensors disposed on opposite sides of said linear array of light-emitting elements, the outputs of which photodetector sensors are combined to produce said output signal.

16. A small scan head assembly for optically operating on a surface and adapted for connection to an external sequentially energizing circuit comprising:
    a housing;
    a plurality of light-emitting elements positioned in said housing to form an array for operating on an area of said surface;
    connection means for connecting said plurality of light-emitting elements to said external energizing circuit to sequentially cause said light-emitting elements to emit light and thereby illuminate successively adjacent regions of the area of said surface;
    fiber optic faceplate means for conducting the emitted light from each of said light-emitting elements to the successive adjacent regions in said area of said surface being operated on; and
    a single effective photodetector means, disposed adjacent to said array of light-emitting elements, for detecting light that has been emitted by said light-emitting elements and reflected from said surface and for generating an electrical output signal representative of the amount of light reflected from the successively illuminated adjacent regions of the area of said surface.

17. A scan head assembly as defined in claim 16, wherein said fiber optic faceplate means comprises a dense plate of parallel optical fibers with a large number of fibers communicating with each of said light-emitting elements.

18. A scan head assembly according to claim 16, wherein said photodetector is configured to provide an electrical output signal representative of the light simultaneously received from each of said different regions of said area of said surface.

19. An electro-optical printer-reader for printing data on light-sensitive recording paper and/or reading a paper document comprising:
- a scan head for selectively illuminating paper passing over its operative surface in response to a control signal, including a plurality of light-emitting elements positioned to form an array, means for sequentially energizing each of said light-emitting elements to emit light in accordance with said control signal, and means for conducting the emitted light to said operative surface;
- processing means for developing recording paper exposed by said scan head; and
- transport means for moving said recording paper or paper document across the operative surface of said scan head and across said processing means.

20. An electro-optical printer-reader as defined in claim 19, wherein said means in said scan head for conducting emitted light to said operative surface comprises a fiber optic faceplate formed of a large number of optical fibers in parallel with plural fibers communicating with each light-emitting element.

21. An electro-optical printer-reader as defined in claim 19, wherein said scan head further includes photodetector means for detecting light emitted from said light-emitting elements which is reflected from the surface of paper passing over said operative surface.

22. An electro-optical printer-reader as defined in claim 21, wherein said light-emitting elements comprise light-emitting diodes.

23. An electro-optical printer-reader as defined in claim 22, wherein said array formed by said light-emitting elements is a linear array.

24. An electro-optical printer-reader as defined in claim 23, wherein said scan head includes timing means for generating timing signals to sequentially energize said light-emitting diodes and detection means responsive to said timing means for synchronously detecting the output of said photodetector means.

25. An electro-optical printer-reader as defined in claim 24, wherein said scan head further includes modulator means responsive to said timing means for modulating the intensity of the light emitted by said light-emitting diodes in response to a data signal.

26. An electro-optical printer-reader as defined in claim 19, wherein said transport means comprises a driven capstan roller mounted on one side of said scan head and processing means from said source of light-sensitive recording material and an idler roller mounted for contact with said capstan roller.

27. An electro-optical printer-reader as defined in claim 26, wherein said paper is dry silver paper which is grasped between said capstan roller and said idler roller so as to be drawn across said scan head and said processing means.

28. An electro-optical printer-reader as defined in claim 27, wherein said processing means is a heater to effect development of said dry silver paper.

29. A scan head assembly for optically operating on a surface comprising:
- an array of light-emitting elements disposed to illuminate an area of said surface;
- means for sequentially energizing each of said light-emitting elements so as to modulate said array and thereby cause said array of elements to emit light and thereby controllably illuminate successively adjacent regions of the area of said surface;
- fiber optic faceplate means for conducting the light emitted from said light-emitting elements to the successive adjacent regions of said area of said surface; and
- photodetector means for detecting light that has been emitted by said light emitting elements and reflected from said surface and for generating an electrical signal representative of the intensity of light reflected from said surface, said signal being coupled to said elements to control the time of modulation of the light-emitting elements of said array.

30. A scan head assembly as defined in claim 29, further including means for synchronizing the operation of said photodetector means with said sequentially energizing means.

31. A scan head assembly according to claim 29, wherein said photodetector means is arranged to provide an electrical output signal representative of the light simultaneously received from each of said different regions of said area of said surface.

32. A small scan head assembly for optically operating on a surface and adapted for connection to an external sequentially energizing circuit comprising:
- a housing
- a plurality of light-emitting elements positioned in said housing to form an array for operating on an area of said surface;
- connection means for connecting said plurality of light-emitting elements to said external energizing circuit to sequentially cause said light-emitting elements to emit light and thereby illuminate successively adjacent regions of the area of said surface;
- fiber optic faceplate means for conducting the emitted light from each of said light-emitting elements to the successive adjacent regions in said area of said surface being operated on;
- a photodetector set in said housing to detect light emitted from said light-emitting elements which is reflected from said surface; and
- a non-direction constraining light window positioned between said surface and said photodetector for transmitting light reflected from said surface to said photodetector.

* * * * *